United States Patent Office 2,957,911
Patented Oct. 25, 1960

2,957,911

PROCESS FOR PREPARING UREAS

John A. Patterson, Fishkill, N.Y., assignor to Texaco Inc., a corporation of Delaware No Drawing. Filed Dec. 26, 1958, Ser. No. 782,998

5 Claims. (Cl. 260—555)

This invention relates to a process for preparing ureas from carbon monoxide and ammonia or a substituted ammonia using moderate conditions in a reaction zone fed with sulphureous substance. Urea is useful as a fertilizer and as a reactant for making plastics and resins. Substituted ureas are useful for making weed killers and moth-proofing agents.

Heretofore it has been proposed to react carbon monoxide with ammonia or a substituted ammonia in the presence of elemental sulfur in a reaction zone to make ureas. In order to induce solution of the sulfur in the reaction mixture it is conventional to use some hydrogen sulfide also. Another conventional process calls for the use of carbonyl sulfide instead of elemental sulfur. Still other conventional processes react ammonia with carbon dioxide to make urea.

My process has the advantage of employing as a hydrogen accepter substance certain sulphureous materials, many of which are normally liquids and most of which are readily soluble under ordinary conditions in the conventional liquid reaction vehicles used in the preparation of ureas from ammonia or a substituted ammonia and carbon monoxide. This simplifies reactor feeding problems. A further advantage of my process is that the yield of ureas is substantially insensitive to dilution of the carbon monoxide feed, and this does not appear to be the case when elemental sulfur with a small amount of solubilizing hydrogen sulfide is used as the hydrogen accepter. The process also uses milder conditions than the conventional syntheses of urea from ammonia and carbon dioxide, and it does not require the expense of producing an intermediate such as carbonyl sulfide.

Broadly, my improvement in a process of the type described comprises supplying the reaction zone with a hydrocarbyl disulfide as the sole sulphureous material, and conducting the reaction in the presence of a solid, particulate dehydrogenation catalyst.

Hydrocarbyl disulfides, both symmetric and assymmetric, are available from refinery sweetening operations of hydrocarbons. They can be made generally be oxidizing mercaptans. Advantageously the disulfide will be readily soluble in the reaction vehicle at ordinary conditions and can be fed to the reactor as a solute in the vehicle. The suitable disulfides have a sulfur-to-sulfur bond; specific disulfides useful in the practice of my process include: dialkyl disulfides such as di-n-butyl disulfide; dialkenyl disulfides such as diallyl disulfide; dicycloalkyl disulfides such as dicyclohexyl disulfide; diaryl disulfides such as diphenyl disulfide; diaralkyl disulfides such as di-p-tolyl disulfide; alkaryl disulfides such as dibenzyl disulfide; and heterocyclic disulfides such as 4,4-dimethyl-1,2-dithiacyclopentane.

Mercaptans are formed as by-products in my synthesis. They can be recovered and reoxidized to the disulfide for reuse using conventional procedures. Alternatively, the mercaptans can be reoxidized using an oxidant such as tetracyanoethylene. The tetracyanoethylene is converted into tetracyanoethane in this recovery scheme, and it can then be reconverted into tetracyanoethylene by oxidation with ferric chloride or lead dioxide.

The dehydrogenation catalyst is essential to the most effective operation of my process. The catalysts useful in my process are particularly the oxides and sulfides of groups V, VI, VII and VIII metals, frequently in combination with a surface active material such as silica or alumina. Examples of advantageous dehydrogenation catalysts for use in my process are molybdenum sulfide on alumina, molybdena-alumina, and nickel tungsten sulfide.

The catalyst is preferably in a fixed bed, but it can be suspended in the reaction mixture if desired. Reaction time can be from about a minute to as long as 10 hours or even more; preferably it is between 10 minutes and 4 hours. In continuous systems reaction time is calculated as an average reaction time, and it is based on the volumetric feed rate of the materials, other than the ones fed in gaseous state to the reactor, and the empty reactor space.

The process is practiced in the presence of a substantially inert liquid vehicle such as methanol, ethanol, isopropanol or other lower ($C_1$—$C_3$) alkanol, petroleum ether, benzene, isopropyl ether, trichloroethylene, aqueous $C_1$—$C_3$ alkanols, ethylene glycol, 2-methoxy ethanol-1, tetrahydrofurfural alcohol, and formamide. The inert vehicle broadly composes about 40 to about 95 weight percent of the reaction mixture as charged, and preferably it is from 70 to 90 weight percent of such mixture. The pressure in the operation should be at least sufficient to suppress substantial volatilization of the liquid vehicle employed. Suitably, the pressure in my process is from 200–2000 p.s.i.g. and preferably it will be between 300 and 1000 p.s.i.g. It is especially advantageous that the reaction vehicle be a solvent at reaction conditions employed for the urea being made, thereby eliminating some solids handling problems in the reactor.

When ammonia is used the product is urea (carbamide). Substituted ammonias yield correspondingly substituted ureas. Suitable amines for the process are hydrocarbyl primary monoamides such as isobutylamine, n-decylamine, and ethylamine. Generally the alkyl primary amines having up to 10 carbon atoms are the most suitable substituted ammonias to use, but use of hydrocarbonyl primary monoamines having ethylenic unsaturation, or even amine alcohols such as monoethanolamine, also are reactants conceivable for my process.

Broadly the temperature for the operation should be between about 150° and about 300° F. When ammonia is the reactant I prefer to use a temperature between about 180° and 250° F. Generally the use of substituted ammonia reactants calls for use of a higher temperature than does the reaction when ammonia itself is employed.

While the carbon monoxide reactant can be concentrated, e.g. 90 volume percent or higher, carbon monoxide gas streams that are comparatively dilute can also be used because my process is substantially insensitive to ill effects from such dilution; (this is not the case when elemental sulfur and solubilizing $H_2S$ are used). Thus, in my process the CO stream can contain 0.2–4 volume parts of carbon monoxide per volume part of hydrogen, nitrogen or other diluent. A suitable CO gas can be generated by the combustion of metallurgical coke with air, or by the partial oxidation of carbon containing substance with oxygen or air to make substantial quantities of hydrogen in connection with the production of CO, a conventional synthesis gas. The carbon monoxide feed also can contain substantial amounts of carbon dioxide, e.g. upwards to 25% or even more as well as carbonyl sulfide, hydrogen sulfide and associated sulphureous impurities which are frequently present in carbon monoxide-bearing streams; these impurities need not be cleansed from the gas. The comparative insensitivity of my process to diluents in the CO makes it especially economical.

The mol ratio of ammonia or substituted ammonia: carbon monoxide used in my process can be between about 10:1 and about 0.1:1 or even lower, but preferably it will be between about 0.1:1 and about 0.5:1 for efficiency and economy in the practice of the process. The mol ratio of ammonia or substituted ammonia:disulfide will be generally broadly between about 1:1 and about 10:1, and preferably it will be between about 3:1 and about 7:1. Suitable materials of construction for use in my process include corrosion resisting ones such as an austenitic stainless steel.

The following examples show how my process has been practiced but they should not be construed as limiting the invention. All percentages given are weight percentages unless otherwise expressly stated. The reactor used in all the operations was a stirred batch pressure vessel made of austenitic stainless steel and having 1535 cc. volume.

*Example 1.*—The reactor was charged with 65 grams of ammonia, 246 grams of dibenzyl disulfide, 100 grams of catalyst, 600 cc. of methanol, and carbon monoxide gas to maintain the pressure in the reactor at about 500 p.s.i.g. The reactor was kept at 248° F. for 3 hours.

The catalyst used in this operation was molybdenum sulfide on alumina in the form of 5/16" diameter by about 5/16" high cylindrical pellets having the following characteristics: specific surface of 140 square meters per gram, 12.45% molybdenum, and 8.35% sulfur.

At the end of the run the reactor was cooled, vented to atmosphere, and the product mixture removed therefrom. The product mixture was filtered, then distilled to a pot temperature of about 185–194° F., and solid product allowed to crystallize from the distilland residue. The solid was further fractionated by extraction with ether. 44.7 grams of urea was obtained in the run for a weight yield of 69% based on the ammonia charged.

In a companion run using virtually the same reaction conditions except that no catalyst was used, the weight yield of urea based on ammonia charged was only 59% (i.e., 38.4 grams of urea).

*Example 2.*—In this operation the catalyst used was the same kind as that used in Example 1. The reaction was charged with 65 grams of ammonia, 100 grams of di-n-butyl disulfide, 100 grams of catalyst, 600 cc. of methanol, and carbon monoxide gas to maintain the pressure in the reactor at about 500 p.s.i.g. The reactor was kept at 240° F. for 3 hours.

15.8 grams of urea was found in the reaction product, this corresponding to a weight yield based on ammonia charged of 24.4%.

In a run operated under practically the same conditions, except that no catalyst was used, no urea was obtained. This shows the importance of the catalyst in the foregoing operation.

I claim:
1. In a process for preparing urea from carbon monoxide and a compound selected from the group consisting of ammonia and alkyl primary amines having up to 10 carbon atoms at a temperature between about 150° F. and 300° F., at a pressure from 200–2000 p.s.i.g. and at a mol ratio of compound:carbon monoxide between about 10:1 and 0.1:1 in a reaction zone containing an inert liquid reaction vehicle, said vehicle composing between about 40 and 95 wt. percent of the reaction mixture, the improvement which comprises supplying the reaction zone with a disulfide selected from the group consisting of di-n-butyl disulfide, diallyl disulfide, dicyclohexyl disulfide, diphenyl disulfide, di-p-tolyl disulfide, dibenzyl disulfide, and 4,4-dimethyl-1,2-dithiacyclopentane, in a mol ratio of compound:disulfide between about 1:1 and 10:1 and conducting the reaction in the presence of a solid particulate dehydrogenation catalyst selected from the group consisting of molybdenum sulfide on alumina, molybdena-alumina, and nickel tungsten sulfide.

2. The process of claim 1 wherein ammonia is used, the product is urea, and the disulfide used is dibenzyl disulfide.

3. The process of claim 1 wherein ammonia is used, the product is urea, and the disulfide used is a di-n-butyl disulfide.

4. The process of claim 1 wherein the catalyst used is molybdenum sulfide on an alumina base.

5. The process of claim 1 wherein the carbon monoxide feed is a dilute gas.

References Cited in the file of this patent

UNITED STATES PATENTS

| | | |
|---|---|---|
| 1,808,465 | Klemenc et al. | June 2, 1931 |
| 1,816,087 | Lindner et al. | July 28, 1931 |
| 2,857,430 | Applegath et al. | Oct. 21, 1958 |
| 2,857,431 | Glass | Oct. 21, 1958 |

FOREIGN PATENTS

| | | |
|---|---|---|
| 295,075 | Germany | Nov. 18, 1920 |

OTHER REFERENCES

Houben et al.: Methoden der Org. Chem., vol. 9, p. 54 (1955).

Klemenc, Ziet. Anorg. Allgem. Chem., vol. 191, pp. 246–282 (1930).